June 8, 1965  J. L. HAGER ETAL  3,187,377
APPARATUS FOR STRIPPING HIDES FROM ANIMALS
Filed Dec. 9, 1963  3 Sheets-Sheet 1
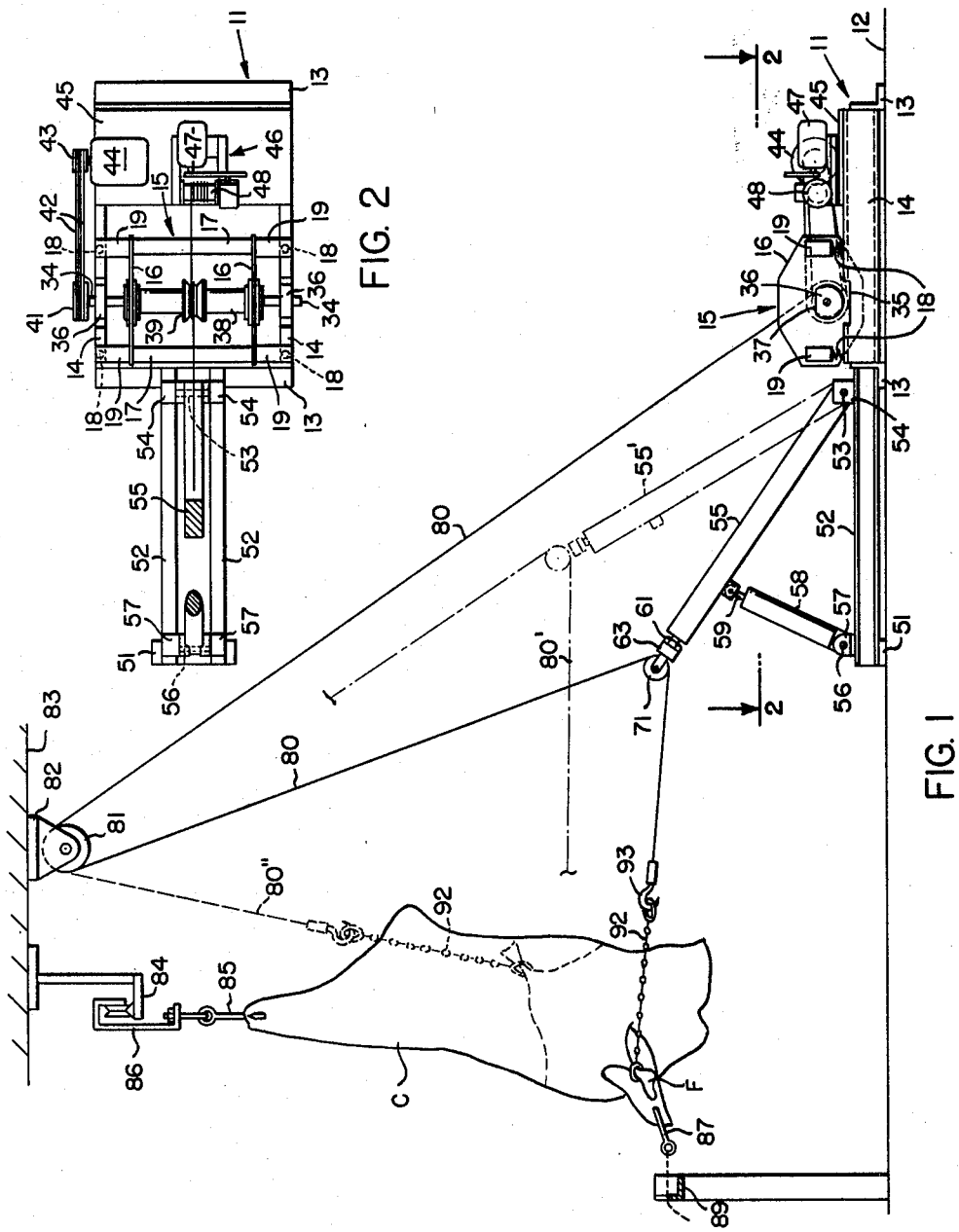
INVENTORS
JOHN L. HAGER
CLYDE C. WHITE
BY
ATTORNEY

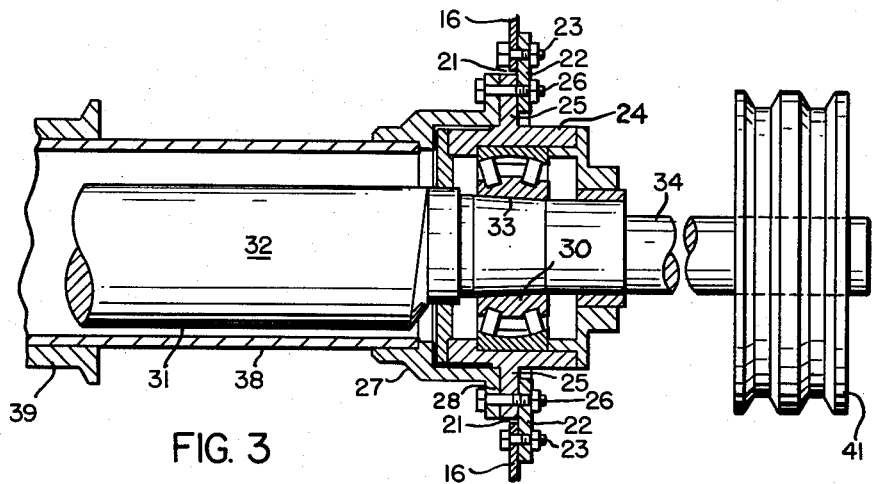
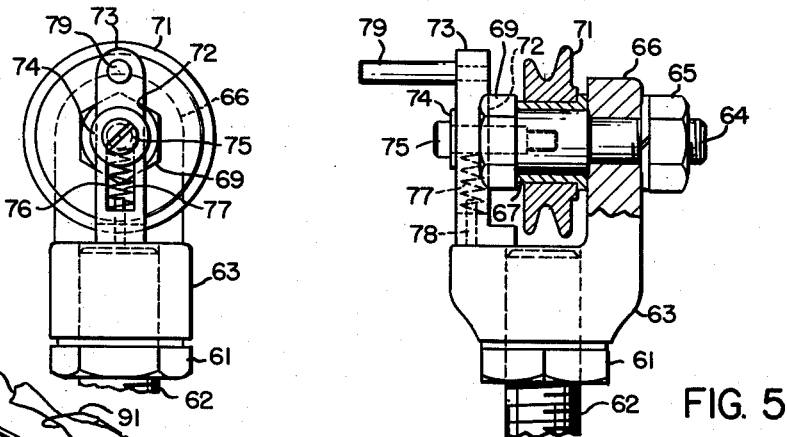
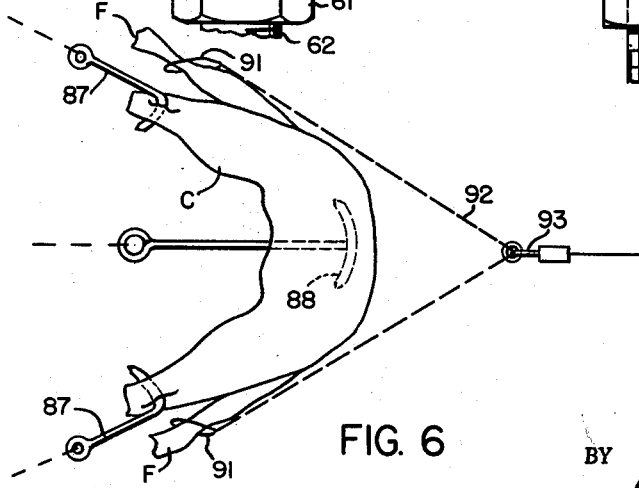
INVENTORS
JOHN L. HAGER
CLYDE C. WHITE
BY
ATTORNEY

INVENTORS
JOHN L. HAGER
CLYDE C. WHITE
ATTORNEY

United States Patent Office

3,187,377
Patented June 8, 1965

3,187,377
APPARATUS FOR STRIPPING HIDES
FROM ANIMALS
John L. Hager, Buffalo, N.Y., and Clyde C. White,
Omaha, Nebr., assignors to Hobam, Inc., Buffalo,
N.Y., a corporation of New York
Filed Dec. 9, 1963, Ser. No. 328,988
15 Claims. (Cl. 17—21)

This invention relates to stripping hides from the carcasses of animals such as beef cattle and the like.

Hide removal usually involves first slitting of the hide lengthwise along the underside of the animal, and lengthwise along the inside of its limbs. Then the hide is peeled from the carcass while endeavoring to avoid disturbing the "fell" or membranous covering, which surrounds the carcass beneath the hide. Normally a considerable amount of manual cutting with a knife is required to prevent any tearing or disturbance of the "fell" during the peeling of the hide therefrom. This manual operation not only is time consuming and expensive, but also involves the risk of possible undesirable slashing of the "fell" unless the skinning knives are handled very deftly.

Machines have been built for stripping hides from animal carcasses, after the underside of the body and the inside of the legs have been slit as described; but all of these machines known to us involve straight pulling of the hide which must necessarily proceed slowly and even then is liable to split the hides, and cause tearing or disturbance of the "fell." Moreover, such machines as have been proposed heretofore are costly and complicated.

A primary object of this invention is to provide apparatus for skinning carcasses which will reduce to a minimum hand skinning and eliminate the need for any cutting during the peeling of a hide from an animal carcass.

Another object of the invention is to provide apparatus for stripping hides from animal carcasses which will effect the stripping operation faster than any machine heretofore built for this purpose.

Another object of this invention is to provide improved apparatus for removing hides from animal carcasses without tearing of the hides or of the "fell."

Another object of this invention is to provide relatively simple, inexpensive and compact apparatus for pulling slit hides from the carcasses of slaughtered animals.

Other objects of the invention will be apparent hereinafter from the specification and from the recital of the appended claims, particularly when read in conjunction with the accompanying drawings.

In the drawings:

FIG. 1 is a side elevational view of apparatus made according to one embodiment of this invention for stripping hide from an animal carcass, parts of the apparatus being shown in phantom to illustrate different operating positions thereof;

FIG. 2 is a sectional view taken along the line 2—2 in FIG. 1 and looking in the direction of the arrows;

FIG. 3 is a fragmentary plan view of part of the vibrator mechanism employed in this apparatus, certain of the parts being shown in section;

FIG. 4 is a fragmentary side elevational view of the manually releasable cable snatch block, which is employed in this apparatus;

FIG. 5 is a front elevational view of this block, certain of the parts being shown in section;

FIG. 6 is a plan view illustrating further the stripping operation;

Figure 7:
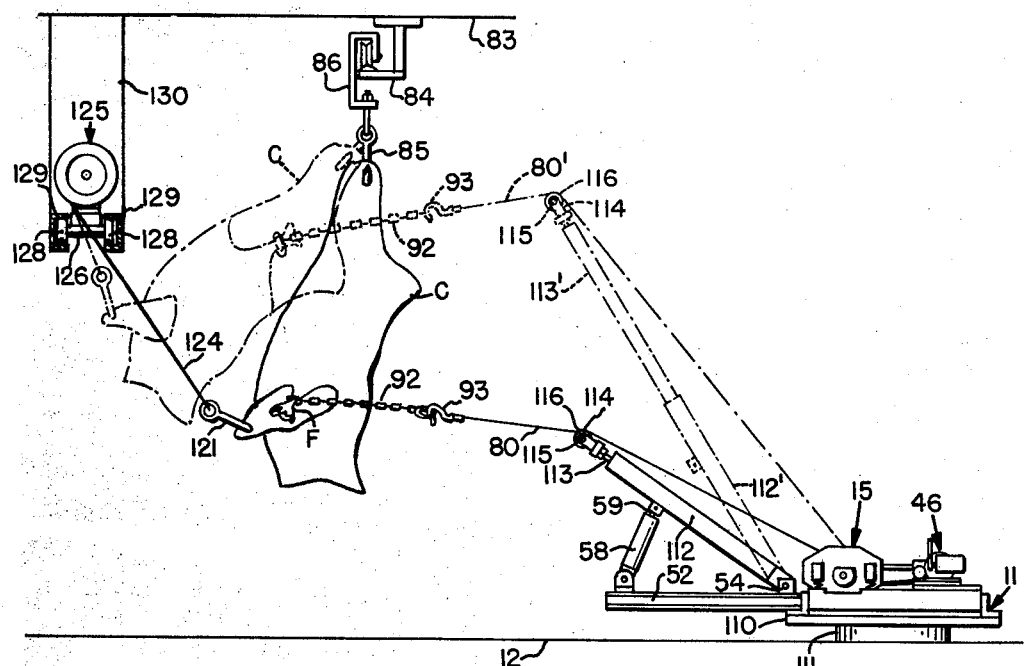
Figure 8:
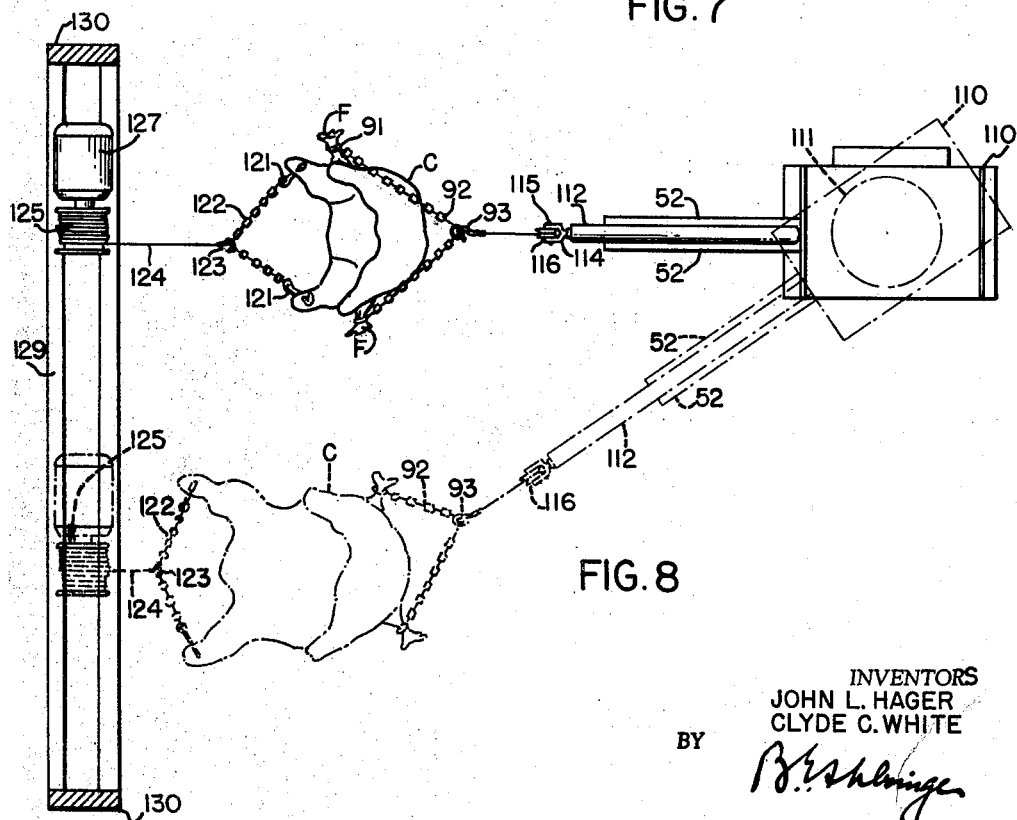

FIG. 7 is a side elevational view of apparatus made according to a further embodiment of this invention for stripping hides from a travelling animal carcass, parts of the apparatus being shown in phantom to illustrate different operating positions thereof; and FIG. 8 is a plan view of the apparatus shown in FIG. 7, parts thereof again being shown in phantom to illustrate different operating positions thereof.

Our novel hide removing apparatus is below described as applied to the removal of hides from the carcasses of cattle; although it is to be understood that the same apparatus may be employed to remove hides from other animals or game, as desired. With the embodiments of the invention illustrated, slaughtered cattle may be stripped of their hides while suspended from hooks that are mounted to roll upon a stationary rail depending from the ceiling of the slaughter house.

In one illustrated embodiment of the invention, when a carcass arrives at a skinning station, the lower end of the carcass is anchored to a fixture on the floor of the slaughter house. Its hide is then slit longitudinally along the under side of the carcass and along the inside of the forelegs, and is skinned back slightly manually from the forelegs and the forequarter. The two free ends of a chain yoke are then secured to the two skinned back portions of the forelegs. The yoke is connected intermediate its ends to one end of a cable that is passed around idler pulleys and for at least one turn about a sheave or drum which is rotatably mounted upon an eccentric shaft that is motor driven. The other end of the cable is secured to the drum of a motor-operated winch. One of the idler pulleys, is mounted rotatably on a fixed support, the ceiling of the packing house, for instance. The other idler pulley, the one nearest the yoke, is carried by a rod that is shiftable to raise this pulley. In the first part of the stripping operation this other idler pulley is in its lower position. When the winch is driven in the take-up direction, the cable becomes taut and pulls the chain yoke in a direction transverse to the carcass to peel back the hide from the forequarter of the carcass. At the same time the eccentric shaft is rotating so that the sheave is vibrated, thereby imparting a vibration to the cable. This causes the pull on the chain yoke, and hence on the two portions of the hide which are attached to the yoke, alternately to be increased and decreased at a relatively high frequency. The resulting vibratory pull on the hide causes a steady, rapid, and gentle separation of the hide from the "fell" or membranous covering of the carcass.

After the hide has been peeled from the forequarter of the carcass, the other idler pulley mentioned above is shifted upwardly so as to peel the hide upwardly and off the mid-portion of the carcass. This motion may be instantaneous. The cable is then disconnected from this other idler pulley, with the result that the direction of pull is shifted so that it is almost vertically upward. The cable continues of course, to be subjected to the vibration as above described, so that the hide continues to be peeled steadily and gently off the rest of the carcass. The suspended carcass may now be conveyed along the ceiling rail to some other point in the slaughter house for further operation on the carcass.

In the other illustrated embodiment of the invention, the carcass is so suspended that it moves continuously along a rail during the dehiding operation. Here the forelegs or lower portion of the carcass are anchored through a second cable to a second winch which is mounted on a carriage that travels with the carcass, as the carcass moves through the dehiding station. The carcass acts as a connection between the continuously moving rail and the carcass anchoring means to effect travel of the carriage with the carcass. For the dehiding operation a chain yoke is again secured to the skinned back portions of the forelegs; but only one idler pulley is employed. A first cable again connects the chain yoke with a first winch, passing around a vibrated drum and over this one idler pulley. Again this idler pulley is shifted instantaneously, after the hide has been pulled from the forequarter of the carcass, to pull the hide from the rest of the carcass. The first cable is, however, not disconnected from the idler pulley. The tension exerted by the second winch on the carcass opposes the tension exerted by the first winch on the hide, and so the hide is stripped easily and smoothly from the carcass through the vibratory pull exerted by the first winch on the first cable.

Referring now to the drawings by numerals of reference, and first to the embodiment illustrated in FIGS. 1 to 6 inclusive, 11 designates generally a rectangular base or support which is adapted to be secured to the floor 12 (FIG. 1) of a slaughter house or the like, and which comprises a pair of spaced, parallel angle irons 13 and a pair of spaced, parallel channel irons 14 that are secured to and extend between the angle irons 13.

Resiliently mounted on top of frame 11 adjacent the forward end thereof (the left end as viewed in FIGS. 1 and 2) is a vibrator unit designated generally at 15. Unit 15 comprises a pair of side plates or panels 16 which are secured in spaced parallel relation to one another by a pair of parallel connecting members 17 (FIG. 2). Opposite sides of unit 15 are supported resiliently on frame 11 by a pair of compression springs 18, each of which at its lower end is secured to the upper face of one of the channel irons 14, and each of which at its upper end is secured to a rigid block 19 that projects laterally from the outer face of a respective panel 16.

Removably mounted in a central opening 21 (FIG. 3) in each of the panels 16 by means of a supporting ring 22, which is secured by bolts 23 to the outer face of each panel 16 in coaxial, overlapping relation with its opening 21, is a cylindrical bearing housing 24. On its outer peripheral surface each housing 24 has a circumferential flange 25. Each housing 24 nests in a collar 27 which has an integral annular attaching flange 28. Flanges 25 and 28 and ring 22 are secured together by nuts and bolts 26.

Rotatably journaled adjacent opposite ends thereof in self-aligning bearings 30 carried by the bearing housings 24 is a vibrator shaft designated generally at 31 in FIG. 3. Shaft 31 comprises an eccentrically machined or offset central portion 32 which terminates at opposite ends thereof in integral, axially aligned end sections 33 (FIG. 3) which are journaled in the self-aligning bearings 30 carried by the housings 24. Each end section 33 has a reduced diameter axial extension 34 which projects outwardly beyond the associated panel 16 and over opposite sides, respectively, of frame 11.

Secured to each shaft extension 34 to rotate therewith above a notch or recess 35 formed in the upper face of each channel iron 14 is a fly wheel 36 (FIGS. 1 and 2) which may be flattened off as at 37. Surrounding the eccentric, center portion 32 of the shaft 31 in radially spaced relation thereto, and fixed at opposite ends thereof in the collars 27, is a stationary sleeve or tube 38. Rotatably mounted on the tube 38, and axially slidable thereon, is a spool-shaped sheave or drum 39.

Secured to the terminal end of one of the shaft extensions 34 is a sheave 41 (FIGS. 2 and 3). The sheave 41 is connected by a pair of belts 42 to a sheave 43 that is secured to the armature of an electric motor 44. Motor 44 is mounted upon a stationary support plate 45 carried by the frame 11 adjacent its rear or right hand end as viewed in FIGS. 1 and 2.

Also mounted on the plate 45 is a power-driven winch 46. Winch 46 is adapted to be driven by a motor 47 which is operable selectively to rotate the drum 48 of the winch in opposite directions about an axis which extends parallel to the axis of rotation of the shaft 31.

Secured at one end thereof to the angle iron 13 at the forward end of frame 11, and at their opposite ends to a stationary block 51 (FIGS. 1 and 2) mounted on the floor 12 in front of the frame 11, are a pair of spaced, parallel channel irons 52. Pivoted at one end thereof upon a pin 53, which extends parallel to the shaft 31 between a pair of stationary plates 54 carried by the channel irons 52 adjacent the frame 11, is a boom 55. Also pivoted at one end thereof upon a pin 56, which extends parallel to the pin 53, between a pair of stationary brackets 57 carried at the opposite, outer ends of the channel irons 52, is an air cylinder 58. Secured at one end to a piston (not illustrated) reciprocable in the cylinder 58, and pivotally connected at its opposite end to the underside of the boom 55 adjacent the free end of the latter, is a piston rod 59.

Secured by a lock nut 61 to a threaded stud 62 (FIGS. 4 and 5) which projects from the free end of the boom 55 is a generally L-shaped block 63. Block 63 has an internally threaded bore by means of which the block is threaded onto the free end of the threaded stud 62. The lock nut 61 serves as a stop against which block 63 seats. The block 63 has at one side an integral, upwardly projecting leg portion 66. Projecting from the portion 66 is a headed stud shaft 64, which is secured by a nut 65 to this leg 66 of the block 63. Journaled on the shaft 64 by means of a flanged bushing 67 is a pulley sheave 71. Bushing 67 is held in place on shaft 64 by the head 69 of shaft 64 when the nut 65 is threaded up on the stud.

On its face remote from the pulley 71, the head 69 of the shaft 64 is provided with a shallow groove or recess 72 which extends diametrically of the head 69. Guided in the groove 72 for sliding movement toward and away from the block 63 is a latching member 73. The member 73 is held for sliding movement in the groove 72 by means of a washer 74 and a screw 75. Screw 75 passes through an elongate slot 76 formed in member 73, and is threaded into the head 69 of the shaft 64. A compression spring 77 is mounted in the slot 76 and presses at its upper end against the screw 75, and at its lower end against the bottom of the slot 76, thereby tending to urge the lower end of the latching member 73 resiliently into engagement with the block 63. At its lower end the spring 77 surrounds a stationary centering pin 78 which is secured in block 63 and projects into slot 76 to prevent the spring 77 from accidentally popping out of the slot. Secured to the upper end of the latching member 73, and projecting at right angles therefrom is a rod or handle 79 for lifting the latching member 73 manually against the action of the spring 77.

For stripping, our novel apparatus is provided with a cable 80, one end of which is secured to the power winch drum 48, and which is wound once or more around the drum 39, and then passes upwardly over a rotatable, support sheave 81, and then downwardly behind and under the sheave 71 (FIG. 1) carried by the boom 55. Sheave 81 is carried by a stationary bracket 82 secured to the ceiling 83 of the slaughter house. The sheave 81 is mounted to rotate in the same vertical plane in which the boom 55 pivots. 84 designates a conventional rail, which is suspended from the ceiling of the slaughter house for conveying meat past the apparatus.

FIGS. 1 and 6 show a slaughtered cattle carcass C, or the like, suspended for stripping of its hide from the rail 84 by means of a hook or hooks 85, which passes or pass into the shank or rear end of the carcass, and which is or are carried by a roller-mounted bracket 86 for sliding movement along the rail 84.

In the operation of the embodiment of the invention shown, the lower end of the carcass is anchored or secured against movement by inserting a pair of shank hooks 87 (FIGS. 1 and 6), and/or a brisket bar 88 (FIG. 6), into its forequarter, and then securing the hooks 87, and/or the bar 88, by chains to an anchor plate 89 fixedly mounted on the slaughter house floor. The hide of the animal is then manually slit from top to bottom along its underside (the left side of the carcass as viewed in FIGS.

1 and 6), and along the inside of the forelegs of the animal; and the hide is skinned back slightly by hand to form two flaps F (FIGS. 1 and 6) at opposite sides of the carcass. Each of the two free ends 91 of a chain yoke 92 is then secured to one of the flaps F, for instance by slip knotting the chain around the flaps; and the yoke is then connected to a hook 93 carried by the free end of the cable 80. At this point in the operation both the boom 55 and the cable 80 are disposed in the positions illustrated by the solid lines in FIG. 1.

To commence the removal of the hide from the carcass, both the motors 44 and 47 are energized by conventional, manually operated switches (not illustrated), the motor 47 being operated to rotate the winch drum 48 in a take-up direction. This rotation causes the cable 80 to be wound slowly onto the drum 48, thereby causing the hook 93 to draw the chain yoke 92, and hence the flaps F toward the guide sheave 71 as illustrated by the full lines in FIG. 1. While this is occurring, the motor 44 is rotating the eccentric shaft 31 at a relatively high rate of speed (for instance from 1100 to 1500 r.p.m.), thereby causing the unit 15 and its rotatable drum 39 to vibrate at a relatively high frequency. Since the cable 80 is wound at least once about the drum 39, the vibrations of the latter are transmitted to the cable, thereby causing the strain on the hide at the point of separation from the carcass to be alternately increased and decreased slightly, and at a relatively high frequency during the peeling back of the hide. Preferably the amplitude of such vibrations is in the range of 3/16 of an inch, which means as many as 900,000 intermittent 3/16" attenuations on the hide at the point of separation of the hide from the membrane. This shakes the hide loose from the carcass without tearing the hide or the "fell."

After the hide has been pulled back from the forequarter of the carcass, or from the left to the right in FIG. 1, a conventional, manually operated valve (not illustrated) for controlling the operation of the air cylinder 58 is operated to cause the piston rod 59 to force the boom 55 instantaneously from its full line to its broken line position 55' in FIG. 1. This movement of the boom shifts the cable to its broken line position at 80' to cause the hide to be stripped back completely from the forequarter and midsection of the carcass. The member 73 (FIG. 5) is then lifted away from block 63 by pulling up on handle 79. The cable 80 is then slipped off sheave 71 and passed under the elevated member 73. The cable then moves by action of the winch to its dash line position 80" (FIG. 1). As the cable 80 swings gradually into this dash line position 80", the motors 44 and 47 cause the cable 80 to effect a vibratory peeling of the hide upwardly of the carcass C, stripping the hide completely away from the hindquarter of the carcass.

After the cable 80 has been removed from the sheave 71, the handle 79 is released, and the boom 55 is returned to its full line position in FIG. 1 by actuating the air cylinder 52 in a reverse direction. Due to the shift of pulley 71 and of the cable, the pull on the hide is at all times at an angle most favorable to vibratory separation of the hide from the carcass, and a steady, rapid and gentle separation is achieved.

After the hide has been completely removed from the carcass, the shank hooks 87, and/or the brisket bar 88, are removed from the lower end of the skinned carcass, and a new carcass is rolled into position in front of the stripping apparatus. The procedure as above described is repeated to strip the hide from the new carcass. Before stripping the hide from the new carcass, the previously stripped hide must be removed from the free ends of the yoke 92, and the cable 80 must be reinserted into the sheave 71.

From the foregoing it will be apparent that applicants' invention substantially eliminates the need for any hand skinning, thereby minimizing the possibility of accidentally slashing or otherwise cutting the hides and the "fell" of the carcass during the hide removal. Less handling of the carcass is necessary, therefore reducing the time the carcass must spend on the wash rack; and less flesh tends to cling to the hides, therefore yielding more saleable skins. Moreover, in addition to being more economical than the apparatus heretofore employed, applicants' novel apparatus takes up very little floor space in a slaughter house; and because of its simplicity of design is relatively easy to maintain. For instance, the diameter of the openings 21 in the panels 16 are greater than those of the flywheels 36 and sheave 41, so that the eccentric shaft 31 and its associated assembly may be removed from the plates 16 merely by removing the bolts 23 from one supporting ring 22, and the bolts 26 from the other supporting ring 22, and then withdrawing the shaft assembly from the central openings 21 in the direction of the first-named ring. Furthermore, by using the pivotal boom 55 and the manually releasable latching member 73 for mounting the cable 80 in the sheave 71, applicants are able to control the angle of pull during hide removal, and eliminate the need for employing a second cable for drawing the hides vertically after the initial peeling of the hides in a direction transversely of the suspended carcass. An additional advantage of applicants' apparatus is the fact that the vibration action on the hide during the peeling thereof from a carcass is increased in intensity as the tension on the cable 80 increases. Therefore, in the event of any sudden increase in the resistance to the separation of the hide from the "fell" of the carcass, the cable tension also increases and intensifies the vibration of the hide at its point of separation from the "fell." In practice, applicants' apparatus compeltely removes the hide from a cattle carcass within a mater of approximately thirty-five seconds.

FIGS. 7 and 8 illustrate skinning apparatus which is adapted to be employed in slaughter houses wherein the suspended animal carcasses move continuously during the skinning step, rather than being anchored to a stationary fixture. In FIGS. 7 and 8 like parts are designated by the same numerals as employed in describing the embodiment illustrated in FIGS. 1 to 6. As in the case of the first-described embodiment, a vibrating unit 15, a take-up winch 46, and a pivoted air cylinder 58 are mounted on a base 11. In this further embodiment, however, base 11 is secured on a turntable 110, which is mounted by support 111 on the floor 12 of a slaughter house for pivotal movement about a vertical axis. Pivoted at its rear end to brackets 54 carried by channel irons 52 that project forward from base 11, and pivotally connected adjacent its forward end to the piston rod 59 carried by the cylinder 58, is an air cylinder or boom 112. Secured at one end to a piston (not illustrated) reciprocable in cylinder 112 is a piston rod 113. This piston rod 113 projects from cylinder 112 and has rotatably mounted thereon at its extremity, by means of a block 114 and pin 115, a pulley 116.

Turntable 110 is mounted at the dehiding station beneath and to one side of the usual overhead rail 84 suspended from a slaughter house ceiling 83 for transporting carcasses. As in the case of the first embodiment, each carcass C is suspended from the rail 84 by means of one or more hooks 85, which are inserted into the hind quarters of the carcass, and which are carried by a roller-mounted bracket 86 for sliding movement along the rail 84. At the dehiding station, as before, each carcass C is slit from top to bottom along its underside, and along the insides of the legs of the animal; and the hide is then skinned back slightly by hand to form two flaps F at opposite sides of the carcass adjacent its lower end. Each of the two free ends 91 of a chain yoke 92 is then secured to one of the flaps F, for instance, by slip knotting the chain around the flap. (The yoke 92 is connected to the hook 93 carried by the free end of the cable 80, which is connected to the vibrator unit 15 and winch 46 as above described.) At substantially the same time, two further hooks 121 are embedded in the forelegs at the lower end of the carcass. These are connected by a further chain yoke 122 (FIG. 8) to a hook 123 secured to the free end of a further take-up cable 124. At its opposite end cable 124 is connected to a second winch designated generally at 125, which is mounted on a carriage 126. Winch 125 is driven by a motor 127 also mounted on the carriage. Carriage 126 is supported by rollers 128 for horizontal sliding movement on a pair of laterally spaced, parallel rails 129. Adjacent opposite ends thereof the rails 129 are secured to a pair of spaced, vertical straps 130, which support the rails 129 slightly below and parallel to the ceiling rails 84 on the side thereof remote from the skinning apparatus. The carriage has a limited movement in one direction on rails 129 during a dehiding operation, and is then returned to starting position, ready for the dehiding operation on the next carcass.

At the commencement of the hide-removing operation, the carcass C is in the position shown by full lines in FIGS. 7 and 8. To start the operation, the motor 127 is energized, by flipping a conventional switch (not illustrated), to drive the winch 125 in a take-up direction, and the vibrating unit 15 and winch 46 are energized as above described with respect to the first embodiment.

As the winches revolve, the cable 124 draws the lower end of the carcass toward the left in FIGS. 7 and 8 and the cable 80 commences to draw the hide toward the right in FIG. 7 in a generally horizontal direction. Thus, tension is put on the carcass in one direction, and on the hide in the opposite direction to accelerate the hide-stripping operation.

While this is occurring, a conventional drive mechanism (not illustrated) causes the carriage 86 to roll on rail 84 and advance the carcass C from its solid toward its broken line position shown in FIG. 8, thereby causing a corresponding movement of the winch 125 and turntable 110, from their solid line to their broken line positions in FIG. 8.

After the vibrating take-up cable 80 has pulled the hide back from the forequarter of the carcass, and during the travel of the carcass from its solid to its broken line position (FIG. 8), manually operated valves (not illustrated) controlling the operation of the air cylinders 58 and 112 are operated to cause, respectively, the boom 112 to be pivoted upwardly into its broken line position at 112' (FIG. 7), and to cause the piston rod 113 to be extended to its broken line position 113'. This shifting of the boom 112 and its piston rod 113 takes place almost instantaneously, and moves the cable 80 from its solid to its broken line position 80', thereby causing the hide to be stripped back completely from the forequarter and midsection of the carcass. As the hide is stripped from the carcass, the pull of winch 125 on cable 124 moves the lower end of the carcass to the left in FIG. 7, tilting the carcass more and more to the vertical, thereby aiding in the stripping operation. In its broken line position 80', the cable effects a vibratory peeling of the hide upwardly of the carcass C and nearly parallel to the length thereof, thereby stripping the hide completely away from the hind quarter of the carcass C by the time the latter reaches its broken line position in FIG. 8.

After the carcass is stripped of its hide, the hide is removed from the chain yoke 92, and the hooks 121 are withdrawn from the forelegs of the carcass so that the carriage 126 may be returned to its starting or full line position in FIG. 8. At the same time the boom 112 and its piston rod 113 are returned to their full line positions as shown in FIG. 7, and the turntable 110 is swung to its full line position (FIG. 8), whereby the apparatus is once again in position to be connected to the next animal carcass delivered to the skinning station.

From the foregoing it will be apparent that the second embodiment of applicants' novel apparatus permits travelling animal carcasses to be stripped of their hides substantially without interruption of the travel of the carcasses through the skinning station. Moreover, by employing a second winch for tilting or inclining each carcass to the vertical, it is possible to employ a single, boom mounted pulley 116 for performing the functions of both the pulleys 71 and 81 in the first embodiment, i.e., guiding the take-up cable 80 first in a direction transverse to the length of the carcass, and then in a direction substantially parallel to the length of the carcass.

The winch 125 has utility, however, even when the carcass does not travel continuously on rail 84 during dehiding, that is, when bracket 86 is stationary during dehiding. The winch 125 and its drive motor 127 will then be mounted on a fixed support instead of being mounted on a carriage 126, and vibrator unit 15 and winch 46 also will be mounted on a fixed support instead of on a turntable 111. The carcass will still be swung to the left in FIGS. 7 and 8 while the hide is being pulled to the right and upwardly, and the boom or cylinder 112 will be shifted upwardly and the piston rod 113 will be moved outwardly as illustrated in FIG. 7 to effect the dehiding operation. However, there will be no swing of the carcass horizontally from the full line to dotted line position of FIG. 8. The only swing will be in the vertical plane. This swing illustrated in FIG. 7 and by the leftward movement of the carcass in FIG. 8.

While the invention has been described in connection with two specific embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as may be applied to the essential features hereinbefore set forth, and as fall within the scope of the invention or the limits of the appended claims.

Having thus described our invention, what we claim is:

1. Apparatus for removing the hide from an animal carcass, comprising
   (a) a rotatable winch rotatable selectively in a take-up direction and in a let-off direction, respectively
   (b) a cable secured at one end to said winch, and adapted to be connected at its opposite end to the hide to pull the hide from the carcass upon the rotation of said winch in its take-up direction, and
   (c) means for constantly increasing and decreasing, by relatively small increments and at a relatively high frequency, the pulling force exerted by said cable on the hide during the rotation of said winch in its take-up direction, thereby to cause the hide to be subjected to intermittent tugs at the point of its separation from the carcass.

2. Apparatus as defined in claim 1 having guide means for guiding the cable during its take-up by said winch comprising
   (a) a first pulley disposed adjacent said winch and over which said cable travels during the removal of said hide,
   (b) a second pulley selectively engageable with said cable and disposed between said first pulley and said opposite end of said cable, and
   (c) means for removably holding said cable on said second pulley, said holding means being operable manually to release said cable from said second pulley without disconnecting said opposite cable end from said hide.

3. Apparatus as defined in claim 1 wherein the last-named means comprises
   (a) a rotatable spool, and
   (b) means for vibrating said spool transversely to its axis during the removal of said hide, and wherein
   (c) said cable is wound, intermediate said opposite end thereof and said winch, at least once about said spool.

4. Apparatus for removing the hide from an animal carcass, comprising
(a) a base,
(b) a spool rotatably mounted on said base for vibratory movement in directions transverse to its axis,
(c) a winch mounted on said base adjacent said spool and operable in take-up and let-off directions, respectively,
(d) a cable connected at one end to said winch and adapted to be connected at its opposite end to the hide to pull the hide from the carcass upon operation of said winch in a take-up direction,
(e) said cable intermediate its ends being looped at least once about said spool, and
(f) means operable during the pulling of the hide from said carcass to effect said vibratory movement of said spool and to cause the cable wound thereabout to exert a pulling force on said hide which increases and decreases slightly in correspondence with the vibration of said spool.

5. Apparatus as defined in claim 4 wherein said means comprises
(a) a pair of spaced support members resiliently mounted on said base for limited vibratory movement relative thereto,
(b) an eccentric shaft extending between and rotatably supported by said support members,
(c) means to rotate said shaft during the operation of said winch in its take-up direction thereby to vibrate said members,
(d) a sleeve surrounding said shaft and connected at opposite ends thereof to said members to be vibrated thereby upon the rotation of said shaft, and wherein
(e) said spool is rotatably mounted on said sleeve for vibration therewith.

6. Apparatus as defined in claim 5, wherein
(a) an annular bearing housing is removably mounted in a central opening in each of said support members to vibrate therewith,
(b) said shaft extends through, and is rotatably journaled in said housings,
(c) said sleeve is secured at opposite ends thereof to said housings, and including
(d) releasable means securing said housings to said support members and releasable to permit said housings, said sleeve, and said shaft to be removed as a unit from the central openings in said members.

7. Apparatus for removing the hide from a slaughtered animal carcass, comprising
(a) a base,
(b) an eccentric shaft rotatably mounted on said base and operative upon rotation to vibrate relative to said base,
(c) a cable adapted to be connected at one end to the hide,
(d) a rotary winch to which the opposite end of said cable is connected, said winch being operable upon rotation in one direction to draw said cable in a direction to pull the hide from the carcass,
(e) means interposed between said cable and said shaft for transmitting the vibration of said shaft to said cable, thereby causing said hide to be subjected to intermittent tugs at the point of its separation from said carcass, and
(f) means to rotate said shaft during the operation of said winch.

8. Apparatus for removing the hide from a suspended animal carcass, comprising
(a) a first cable adapted to be connected at one end to said hide adjacent the lower end of the suspended carcass,
(b) means connected to the opposite end of said first cable and operable to draw said first cable in a take-up direction to pull said hide from said carcass,
(c) a second cable adapted to be connected at one end to said lower end of said carcass,
(d) means connected to the opposite end of said second cable and operative to pull the lower end of the carcass in a direction opposite that in which the hide is pulled by said first cable,
(e) a vibratory means connected to one of said cables and operative during the pulling of the hide from said carcass alternately to increase and decrease slightly, and at a relatively high frequency, the pulling force exerted on said hide, and
(f) means for guiding said first cable first in a substantially horizontal direction during the initial pulling of the hide from said carcass, and thereafter in an upwardly inclined direction during the removal of the remainder of the hide from said carcass.

9. Apparatus as defined in claim 8 wherein the first-named means comprises
(a) a first winch positioned at one side of said carcass, the second-named means comprises
(b) a second winch positioned on the opposite side of said carcass and operable simultaneously with said first winch and side guide means comprises
(c) a pulley engageable with said first cable between said carcass and said first winch, and movable between a first position adjacent said lower end of said carcass in which it guides said first cable in said horizontal direction, and a second position adjacent the upper end of said carcass in which it guides said cable in said upwardly inclined direction, and generally parallel to the inclined carcass.

10. Apparatus as defined in claim 9, wherein said carcass is moved continuously linearly during the removal of said hide, and including
(a) means mounting said pulley and said first winch to be swiveled as a unit about a vertical axis by the moving carcass, and
(b) means mounting said second winch for movement by said carcass in a direction parallel to the direction in which said carcass in advanced.

11. Apparatus for removing the hide from an animal carcass, which is suspended vertically between the floor and ceiling of a slaughter house, comprising
(a) a cable adapted to be connected at one end to said hide adjacent the lower end of said carcass,
(b) a rotatable winch connected to the opposite end of said cable for drawing said cable in a direction to pull said hide from said carcass,
(c) a first pulley mounted above the upper end of said carcass and supporting said cable intermediate its ends,
(d) a second pulley mounted adjacent the lower end of said carcass between said first pulley and said one cable end and movable between a first and a second position, respectively, and releasably engageable with said cable to guide, when in said first position, said cable in a substantially horizontal direction during the pulling of said hide from said carcass,
(e) releasable latching means associated with said second pulley and operable to permit said cable to be disengaged from said second pulley without disconnecting said one end of said cable from the hide,
(f) said first pulley operating after the release of said cable from said second pulley to guide said cable upwardly in a substantially vertical direction, and
(g) vibratory means connected to said cable and operative during rotation of said winch alternately to increase and decrease slightly, and at a relatively high frequency, the force exerted by said cable on the hide.

12. Apparatus for stripping a hide from a carcass, comprising
(a) a rotary winch
(b) a cable secured at one end to said winch and adapted to be connected at its other end to the hide,
(c) means for rotating said winch to wind up said cable and effect a stripping pull on the hide, and (d) means for imparting a longitudinal vibratory movement to said cable during wind-up thereof.

13. Apparatus for stripping a hide from a suspended animal carcass comprising
   (a) means for anchoring the lower end of said carcass,
   (b) a rotary winch mounted at one side of said carcass,
   (c) a cable secured at one end to said winch and adapted to be connected at its other end to the hide adjacent the lower end of said carcass,
   (d) means for guiding said cable between the hide and said winch comprising at least one pulley,
   (e) means for rotating said winch to wind up said cable and effect a stripping pull on the hide,
   (f) a movable support on which said one pulley is mounted,
   (g) means for shifting said support during the stripping operation to change the direction of pull on the hide, and
   (h) means for imparting a longitudinal vibratory movement to said cable during wind-up thereof.

14. Apparatus for stripping a hide as claimed in claim 13, wherein
   (a) said movable support is a pivoted boom,
   (b) said support moving means is a fluid-pressure operated piston and cylinder, one of which is connected to said boom, and
   (c) said anchoring means comprises a second winch adapted to be connected by a second cable to the lower end of the carcass and operable upon operation of said second winch to exert a pull on the lower end of the carcass opposite to that exerted by the first-named winch.

15. Apparatus for stripping a hide as claimed in claim 13, wherein said cable guiding means also includes
   (a) a rotary spool around which said cable is wound and which is interposed between said winch and said one pulley,
   (b) a tube
   (c) said spool being mounted on said tube to rotate thereon, and wherein
   (d) said vibratory means comprises a shaft mounted rotatably in said tube and having an eccentric portion disposed within said tube and extending longitudinally thereof, and
   (e) means for rotating said shaft to vibrate said tube and spool.

References Cited by the Examiner
UNITED STATES PATENTS

| | | | |
|---|---|---|---|
| 537,215 | 4/95 | Mead | 17—45 |
| 1,265,407 | 5/18 | Wallin | 17—45 |
| 3,046,597 | 6/62 | Macy et al. | 17—21 |
| 3,129,454 | 4/64 | Johnson | 17—21 |

SAMUEL KOREN, *Primary Examiner.*

LUCIE H. LAUDENSLAGER, *Examiner.*